(12) United States Patent
Grandou et al.

(10) Patent No.: US 7,797,520 B2
(45) Date of Patent: Sep. 14, 2010

(54) EARLY BRANCH INSTRUCTION PREDICTION

(75) Inventors: Gilles Eric Grandou, Plascassier (FR); Phillippe Jean-Pierre Raphalen, Valbonne (FR); Richard Roy Grisenthwaite, Cambridgeshire (GB)

(73) Assignee: ARM Limited, Cambridge (GB)

( * ) Notice: Subject to any disclaimer, the term of this patent is extended or adjusted under 35 U.S.C. 154(b) by 488 days.

(21) Appl. No.: 11/170,083

(22) Filed: Jun. 30, 2005

(65) Prior Publication Data

US 2007/0005938 A1    Jan. 4, 2007

(51) Int. Cl.
*G06F 9/00*    (2006.01)
(52) U.S. Cl. ...................................... 712/237; 712/238
(58) Field of Classification Search ................. 712/237, 712/238
See application file for complete search history.

(56) References Cited

U.S. PATENT DOCUMENTS 4,943,908 A * 7/1990 Emma et al. ................ 712/240
5,592,634 A * 1/1997 Circello et al. ............. 712/239
5,642,500 A * 6/1997 Inoue ......................... 712/233
5,850,542 A * 12/1998 Schroter et al. ............. 712/235
5,889,986 A * 3/1999 Nguyen et al. .............. 712/237
6,044,459 A * 3/2000 Bae et al. .................... 712/237
6,651,162 B1 * 11/2003 Levitan et al. .............. 712/238
2003/0204705 A1 * 10/2003 Oldfield et al. ............. 712/207
2004/0168042 A1 * 8/2004 Lin ............................ 712/207
2006/0149947 A1 * 7/2006 Su ............................. 712/239
2006/0200655 A1 * 9/2006 Smith et al. ................ 712/238
2006/0224871 A1 * 10/2006 Tran .......................... 712/239

* cited by examiner

*Primary Examiner*—Eddie P Chan
*Assistant Examiner*—Keith Vicary
(74) *Attorney, Agent, or Firm*—Nixon & Vanderhye P.C.

(57) ABSTRACT

A data processing apparatus including a prefetch unit for prefetching the instructions from a memory, branch prediction logic and a branch target cache for storing predetermined information about branch operations executed by the processor. The information includes identification of an instruction specifying a branch operation, a target address for said branch operation and a prediction as to whether said branch operation is taken or not. The prefetch unit accesses said branch target cache at least one clock cycle prior to fetching an instruction from said memory, to determine if there is predetermined information corresponding to said instruction stored within said branch target cache.

12 Claims, 6 Drawing Sheets

2 cycle latency, no folding

EARLY BRANCH INSTRUCTION PREDICTION

BACKGROUND OF THE INVENTION

1. Field of the Invention

This invention relates to the field of data processing systems. More particularly, this invention relates to the field of predicting branch instructions in data processing.

2. Description of the Prior Art

A data processing apparatus will typically include a processor core for executing instructions. Typically, a prefetch unit will be provided for prefetching instructions from memory that are required by the processor core, with the aim of ensuring that the processor core has a steady stream of instructions to execute, thereby aiming to maximise the performance of the processor core.

To assist the prefetch unit in its task of retrieving instructions for the processor core, prediction logic is often provided for predicting which instruction should be prefetched by the prefetch unit. The prediction logic is useful since instruction sequences are often not stored in memory one after another, since software execution often involves changes in instruction flow that cause the processor core to move between different sections of code depending on the task being executed.

When executing software, a change in instruction flow typically occurs as a result of a "branch", which results in the instruction flow jumping to a particular section of code as specified by a target address for the branch. The branch can optionally specify a return address to be used after the section of code executed by the branch has executed.

Accordingly, the prediction logic can take the form of a branch prediction unit which is provided to predict whether a branch will be taken. If the branch prediction unit predicts that a branch will be taken, then it instructs the prefetch unit to retrieve the instruction that is specified by the target address of the branch, and clearly if the branch prediction is accurate, this will serve to increase the performance of the processor core since it will not need to stop its execution flow whilst that instruction is retrieved from memory. Typically, a record will be kept of the address of the instruction that would be required if the prediction made by the branch prediction logic was wrong, such that if the processor core subsequently determines that the prediction was wrong, the prefetch unit can then retrieve the required instruction.

Branch prediction logic has been used in conjunction with branch target address caches (BTACs). In order to improve branch prediction success rates, dynamic branch prediction can be performed which uses historical information about what happened on previous branch instructions to predict what may happen. This historical information is typically stored in a BTAC, the BTAC being accessed by the prediction logic to determine if a branch should be taken or not.

Typically in such systems the program fetch unit PFU looks up the program counter to access the instruction within the Icache and at the same time accesses the BTAC to see if there is an entry corresponding to that instruction. If the instruction that is fetched is a branch instruction the processor awaits the result from the BTAC look up to predict whether to branch or not. Such systems will have some latency as data accesses take a finite amount of time. Typical systems have a two cycle latency, thus two cycles are required before the information from the BTAC is accessed and branch prediction for the retrieved instruction can be performed. In some systems buffers have been used to store fetched instructions and their branch predictions in order to avoid this wait manifesting as bubbles in the pipeline. In this way the bubbles can be hidden and a continuous flow of instructions can be provided to the pipeline.

FIG. 1 shows a timing diagram of the instruction accesses of a system with a two cycle latency. As is shown a bubble is introduced into the system due to the latency, although this can be removed using buffers to store instructions before sending them to the pipeline. A further disadvantage of such a system is that as the fact that instruction A+1 branches to B is not known until two cycles after the access to instruction A+1 is initiated, accesses to instruction A+2 has been initiated before it is known that it is not required. Thus, an unnecessary Icache access is made, which is expensive on power consumption. In systems with a latency of more than two cycles further unnecessary data accesses will be made.

SUMMARY OF THE INVENTION

Viewed from one aspect the present invention provides a data processing apparatus, comprising a processor for executing instructions; a prefetch unit for prefetching instructions from a memory prior to sending those instructions to said processor for execution; branch prediction logic; and a branch target cache for storing predetermined information about branch operations executed by said processor, said predetermined information including, identification of an instruction specifying a branch operation, a target address for said branch operation and a prediction as to whether said branch is taken or not; wherein said prefetch unit is operable prior to fetching an instruction from said memory, to access said branch target cache and to determine if there is predetermined information corresponding to said instruction stored within said branch target cache and if there is to retrieve said predetermined information; said branch prediction logic being operable in response to said retrieved predetermined information to predict whether said instruction specifies a branch operation that will be taken and will cause a change in instruction flow, and if so to indicate to said prefetch unit a target address within said memory from which a following instruction should be fetched; wherein said access to said branch target cache is initiated at least one clock cycle before initiating fetching of said instruction from said memory.

The present invention recognises the problem of power consumption associated with instruction accesses and seeks to reduce the number of unnecessary instruction accesses that are performed. It addresses this problem in a simple yet elegant way by performing a branch target cache lookup in advance of an instruction fetch. Thus, information relating to branch prediction can be retrieved early and this enables the processor to be able to predict whether a branch is taken or not sooner than would be the case had an access to the branch target cache been performed at the same time as the instruction fetch. This early prediction allows instruction fetches of instructions that would have followed a branch instruction had the branch not been taken, not to be fetched if it is predicted that the branch is to be taken. This provides a cache power saving.

In some embodiments, said prefetch unit is operable to retrieve said predetermined information from said branch target cache within a predetermined number of cycles, said data processing apparatus being operable to initiate access to said branch target cache at least said predetermined number of cycles prior to fetching said instruction from said memory.

A system will have some latency such that it will take a certain number of cycles to look up a value within a cache, be it the branch target cache (BTAC) or the instruction cache (if the instruction is stored within an instruction cache). If the BTAC lookup is initiated a number of cycles before the instruction is fetched from the memory, where the number of cycles is equal to the latency of that cache lookup then the information regarding that instruction will have been retrieved when the instruction is to be looked up. This has the advantage that on looking up the instruction the system has information as to whether that instruction is a branch or not and whether or not that branch is predicted as taken or not. This can prevent or at least reduce bubbles appearing in the pipeline and also prevent or at least reduce unnecessary instruction fetches.

In some embodiments, following a branch being taken said prefetch unit is operable to increment said target address by a value equal to said predetermined number of cycles and to access said branch target cache to determine if there is predetermined information corresponding to an instruction at said incremented target address stored within said branch target cache and if there is to retrieve said predetermined information.

If a branch is predicted as taken, it is advantageous if the prefetch unit is then operable to increment the target address by a value equal to the predetermined number of cycles and to access information corresponding to an instruction at this incremented target address. This ensures that following a branch that is taken the BTAC is still looked up the required latency number of cycles ahead of the subsequent instruction fetches. Thus, the relevant information is accessed at the correct time. It should be noted that one drawback of doing this is that the information for the branch instruction itself and depending on the latency, possibly the instruction(s) following it is not accessed. This means that if there is a branch instruction immediately following a branch instruction then this instruction can not be predicted. It has been found, however, that this is not a great problem and can be avoided or at least reduced by implementing a compiler in such a way that branch instructions are not located adjacent to each other in the code.

In some embodiments, said predetermined information further includes a branch removal prediction, said branch prediction logic is operable in response to said accessed predetermined information predicting a branch operation that will be taken and predicting a branch instruction that can be removed, to indicate to said prefetch unit to fetch said following instruction from said target address and not to fetch said instruction.

A further advantage of receiving the information regarding prediction before the instruction is fetched is that if additional information is stored within the branch target cache relating to a prediction as to whether the branch instruction can be removed or not, then this information is available prior to accessing the instruction that might be removed, and thus this access need not be made. This provides a further power saving as a further instruction fetch is avoided. In this case the prefetch unit is able to access the instruction to which the program branches and it does not need to access the instruction itself. It should be noted that the branch is only removed as described above if the branch is predicted taken. However, in some embodiments, branches can be removed even if the branch is predicted not taken, in this case the instruction immediately following the branch instruction is fetched and the branch instruction itself is not fetched.

In some embodiments said predetermined information includes further branch information, said predetermined information being sufficient to indicate to said data processing apparatus whether a branch is resolved as taken or not.

It is found to be particularly helpful, if further branch information is included within the BTAC, this information being sufficient to indicate to the data processing apparatus whether a branch is taken or not. In the case where a branch is removed, the actual instruction indicating the branch is not accessed and therefore the information associated with this instruction is not available to the data processor. Generally, a data processor determines whether or not a branch should have been taken, i.e. whether a prediction was correct or not, from this information. Thus, if this information is included within the BTAC, this information has already been accessed by the prefetch unit and can be made available to the data processor so that the data processor can confirm whether the branch prediction was correct or not even without accessing the branch instruction itself.

In some embodiments, said further branch information comprises a condition code, said condition code indicating at least one condition, said at least one condition determining whether said branch should be taken or not.

The use of a condition code which does not have to be very wide but which can be used to determine whether the branch should have been taken or not means that no memory access for removed branches needs to be made which reduces the power consumption. Furthermore, there is very little increase in size associated with such storage as the condition codes are themselves small.

In some embodiments following detection of a branch instruction by retrieving said corresponding predetermined information, said prefetch unit is operable to send a predicted following instruction in parallel with a non-predicted following instruction to said processor, said predicted following instruction being sent to said processor for execution.

It has been found to be advantageous in some cases to send the non-predicted branch as well as the predicted one. This means that if the prediction is wrong the processor has access to the instruction that should have been performed, without having to do a separate fetch. This clearly has speed implications for the processor.

In some embodiments, following execution of said predicted following instruction said data processing apparatus is operable to determine whether said branch would be resolved as taken or not taken from said predetermined information corresponding to said instruction.

If the information included within the BTAC is sufficient to enable the processor to resolve whether the branch is taken or not, then the processor can perform this task with information already accessed by the prefetch unit which has both speed and power saving implications.

In some embodiments, said data processing apparatus is operable in response to said determination indicating that said branch prediction logic had falsely predicted said branch, to update said prediction within said predetermined information, to store said updated predetermined information within said branch target cache and to send said non-predicted following instruction to said processor core for execution.

It is advantageous if in addition to correcting the processing of branches that have been wrongly predicted if the BTAC is updated, such that in future the branch is more likely to be correctly predicted.

A further aspect of the present invention provides a method of processing data comprising: accessing a branch target cache within a data processing apparatus to determine if there is predetermined information corresponding to an instruction stored within said branch target cache and if there is retrieving said predetermined information; in response to said retrieved predetermined information, predicting whether said instruction specifies a branch operation that will be taken and will cause a change in instruction flow, and if so indicating to a prefetch unit a target address within said memory from which a following instruction should be fetched; prefetching instructions from a memory prior to sending those instructions to said processor for execution; wherein said access to said branch target cache is initiated at least one clock cycle before initiating fetching of said instruction from said memory.

A still further aspect of the present invention provides a data processing apparatus comprising: a branch target cache operable to store predetermined information about branch operations executed by said processor, said predetermined information including, identification of an instruction specifying a branch operation, a target address for said branch operation, a prediction as to whether said branch is taken or not and further branch information; wherein said data processing apparatus is operable in response to said predetermined information corresponding to said instruction stored in said branch target cache to resolve if said branch operation specified by said instruction is taken or not.

A BTAC which stores sufficient information to indicate to the data processing apparatus whether a branch is taken or not, enables the processing unit to resolve this without accessing the instruction itself. This can be particularly advantageous in the case where a branch is removed, and the actual instruction indicating the branch has not been accessed by the data processor and therefore the information associated with this instruction is not available to it. Including this information within the BTAC, means that the data processor can confirm whether the branch prediction was correct or not even without accessing the branch instruction itself.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 2:
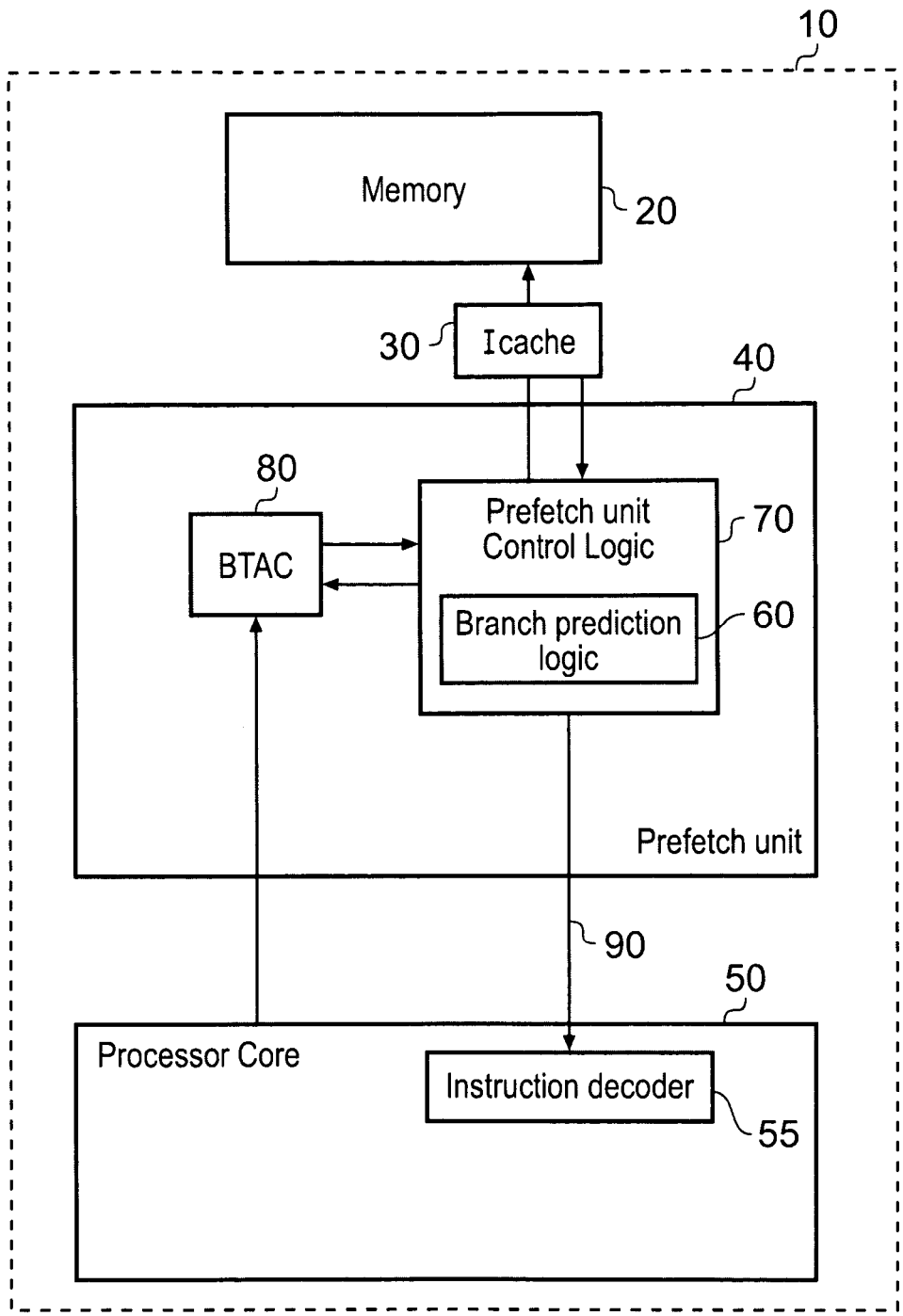
FIG. 2 shows a data processing apparatus according to an embodiment of the present invention.

FIG. 2 shows a data processing apparatus 10 according to an embodiment of the present invention. Data processing apparatus 10 comprises a memory 20. Although in this embodiment memory 20 is shown as being within data processing apparatus 10 it should be understood that this memory 20 could be located outside of the data processing apparatus 10. The apparatus also comprises an instruction cache, I-cache 30, operable to store instructions and a prefetch unit 40. Prefetch unit 40 is operable to fetch instructions from the instruction cache 30 or if they are not present in the instruction cache from memory 20 and to route these instructions to processor core 50 and in particular to instruction decoder 55 within processor core 50.

Within the prefetch unit 40, dynamic branch prediction logic 60 is provided to assist the prefetch unit in deciding what subsequent instructions to retrieve for the processor core 50. This dynamic branch prediction logic 60 is provided as part of the prefetch unit control logic 70. Dynamic predictions use historical information about what happened one or more times that a particular branch operation was encountered to predict what will happen this time. In this embodiment, this historical information is stored within a branch target cache, BTAC 80. In this embodiment the BTAC 80 is controlled by processor core 50. In other embodiments BTAC 80 can be controlled by the prefetch unit 40 itself.

In operation, when a program counter is issued to the prefetch unit indicating an instruction to be retrieved from the instruction buffer, the prefetch unit provides that program counter to the BTAC 80, where it is compared with the program counters of the various branch operations recorded within the BTAC memory. If the program counter matches one of the program counters for an entry in the BTAC memory, this indicates that the instruction to be retrieved is a branch instruction and accordingly the dynamic branch prediction logic 60 should be used to predict whether that branch will be taken. Accordingly, the contents for the relevant entry within the BTAC memory are output to the dynamic branch prediction logic to enable that logic to determine whether the branch will be taken or not. As will be appreciated by those skilled in the art, many branch prediction schemes exist and accordingly will not be discussed in further details herein.

Figure 1:
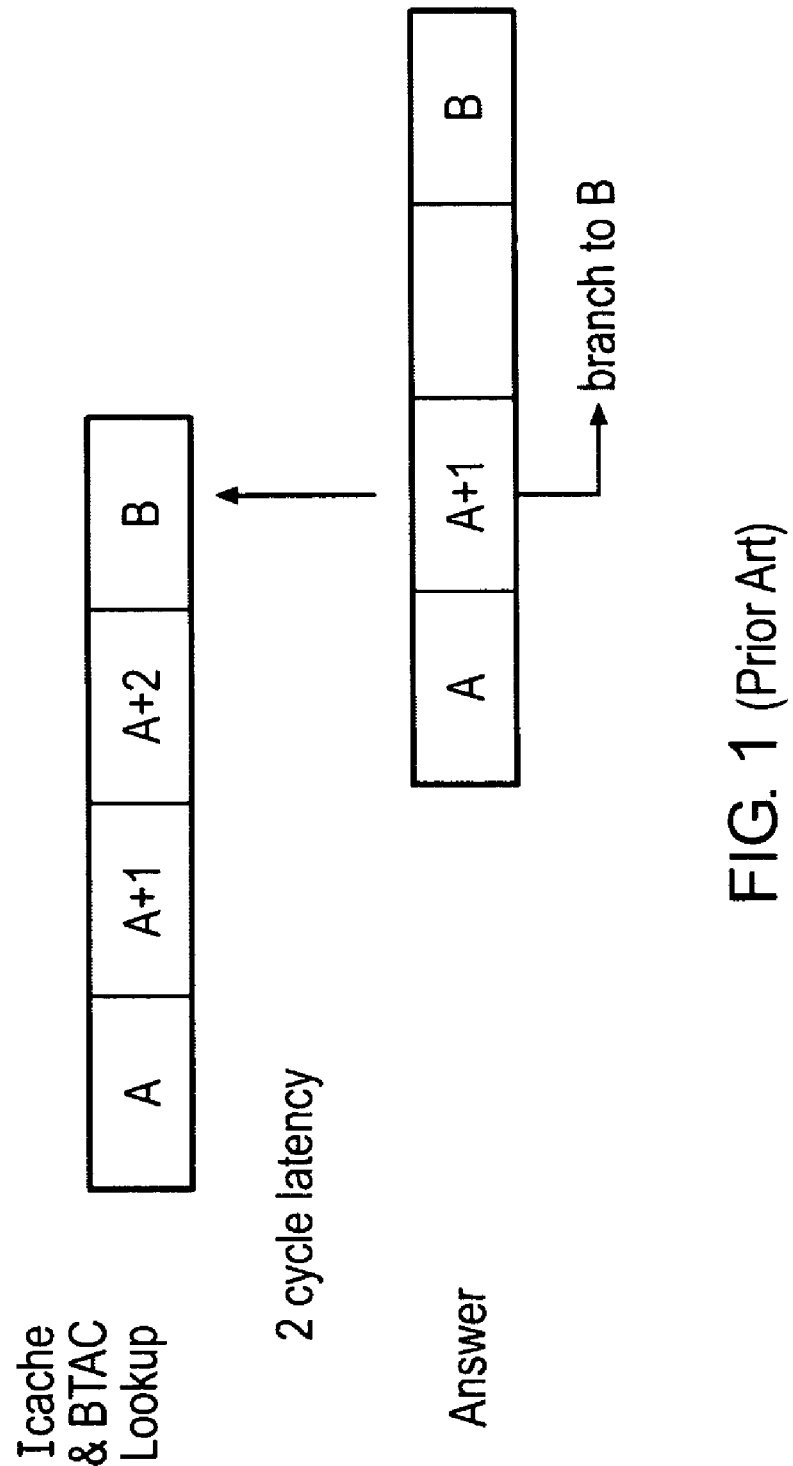
FIG. 1 schematically illustrates a timing diagram of Icache and BTAC accesses according to the prior art.
Figure 3:
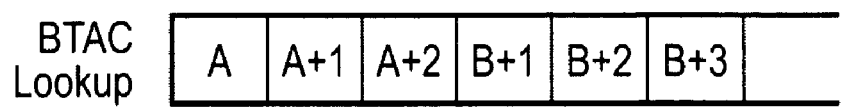
FIG. 3 schematically illustrates a timing diagram of Icache and BTAC accesses according to an embodiment of the present invention.
Figure 3:
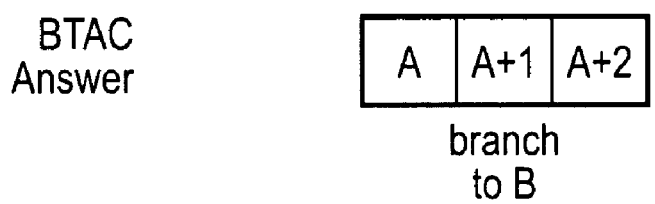
Figure 3:
Figure 3:
Figure 4:
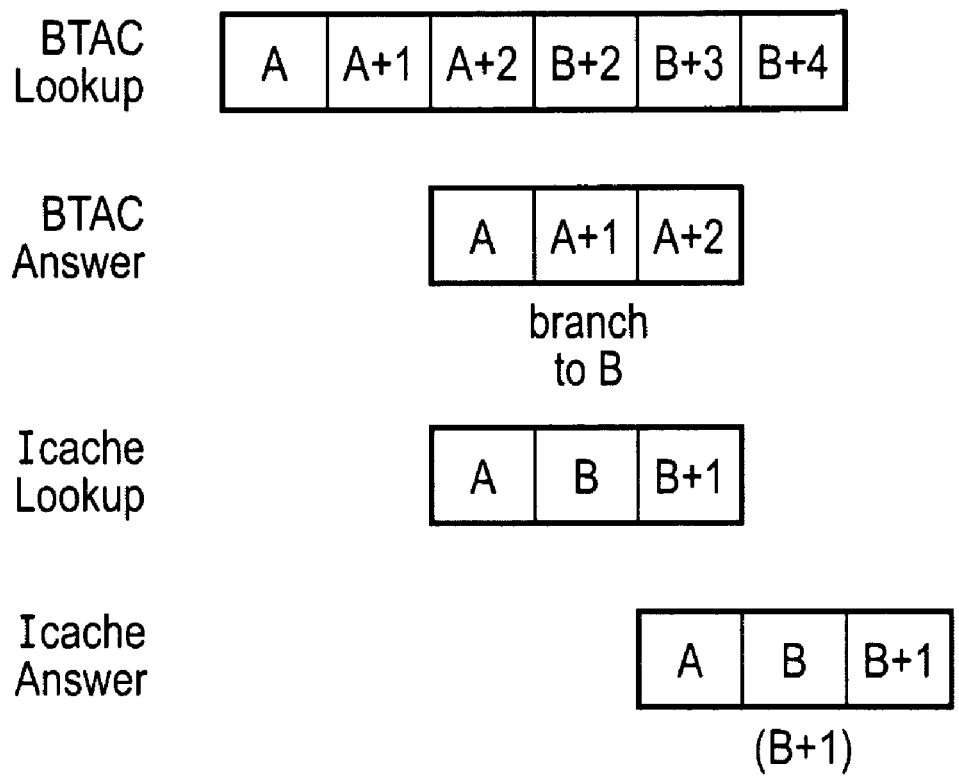
FIG. 4 schematically illustrates a timing diagram of Icache and BTAC accesses with branch removal according to an embodiment of the present invention.

The operation of the system shown in FIG. 2 and in particularly the prefetch unit 40 and branch prediction logic 60 will be described in more detail with reference to the timing diagrams of FIGS. 3 and 4. FIG. 3 shows a timing diagram of the operation of the data processing apparatus of FIG. 2 having a two cycle latency and with no branch instruction removal. As can be seen in response to a program counter issuing a value corresponding to instruction A, the BTAC 80 is accessed to see if there is any information stored corresponding to this counter value. The BTAC has a two cycle latency and thus two cycles later we get the answer from the BTAC as to whether or not there was information relating to instruction A. In the meantime program counter values corresponding to instructions A+1 and A+2 have also been issued to the BTAC. The BTAC answer to instruction A is that there is no information stored and it is not a branch instruction. The BTAC answer to instruction A+1 is that it is a branch instruction and in this case the BTAC predicts that the instruction is taken. In this embodiment the I-cache lookup is issued two cycles after the BTAC lookup in other words at about the same time as the BTAC answer is received. Thus, the I-cache lookup for instruction A is initiated when the BTAC answer is known, thus, when the I-cache looks up instruction A+1 it has its BTAC answer and knows that it will branch to B thus, in the next cycle it can request instruction B. Thus, the I-cache answer which comes back two cycles later as a continuous stream of information, this information being instruction A, instruction A+1 and instruction B. Thus, there are no bubbles in the pipeline. Furthermore, there are also no unnecessary lookups in the I-cache and thus power is saved compared to the system of FIG. 1 where the I-cache looked up instruction A+2 which was then discarded.

FIG. 3 shows the timing diagram of an embodiment of the present invention in which no branch removal or branch folding occurs. Embodiments of the present invention are particularly suited to efficient branch removal and this can be seen with reference to FIG. 4. As in the previous example instruction A+1 is an instruction to branch to B and it is predicted that this branch is taken. There is also information present in the BTAC 80 which indicates whether a branch can be removed or not. In this case it is indicated that instruction A+1 can be removed, as all the information that this instruction provides is "branch to B" and as such it does not need to be input to the pipeline. Thus, when the BTAC answer for A+1 is received the prefetch unit 40 knows that the subsequent instruction is B and that instruction A+1 does not need to be retrieved. This is known at the point when the I-cache lookup for the instruction after A is to be commanded. Thus, at this point it can be told to look for instruction B and thus a stream of instructions A, B, B+1 with no holes is achieved. Furthermore, I-cache lookups of A+1 and A+2 are avoided as compared to the prior art of FIG. 1. This gives a significant power saving. It should be noted from this figure that information that is gained from the BTAC answer to A+1 is also used with reference to which lookup should be performed next by the BTAC. Generally, the BTAC should look for instruction B then instruction B+1. However, were it to do this then it would no longer be two cycles ahead of the I-cache lookup with the attendant advantages. For this reason, the BTAC lookup that occurs next is for instruction B+2. This therefore maintains the two cycle lead for the BTAC lookup over the I-cache lookup. A disadvantage of this is that there is no information related to branches retrieved for instruction B or instruction B+1. This is of course only a problem if either instruction B or instruction B+1 is a branch. This problem can therefore be avoided if suitable compilation software is used such that branch instructions are not placed near to each other.

Figure 5A:
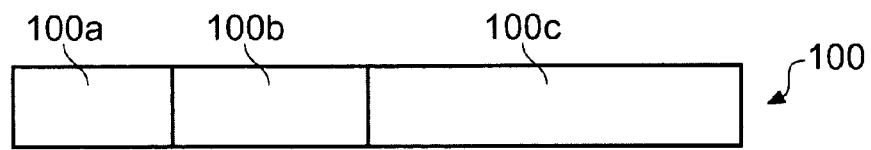
FIG. 5 schematically shows an instruction and a BTAC entry according to an embodiment of the present invention.

FIG. 5A shows a 32 bit branch instruction 100. It comprises a condition code 100a which contains information about the conditions which need to be fulfilled for the branch to be taken or not. The data processing apparatus 10 determines if this branch is resolved taken or not with reference to this code. It also comprises an instruction type 100b with determines what type of instruction it is, for example, whether it is a branch instruction or not and an immediate value 100C which is the offset to the program counter and provides the instruction address.

Figure 5B:
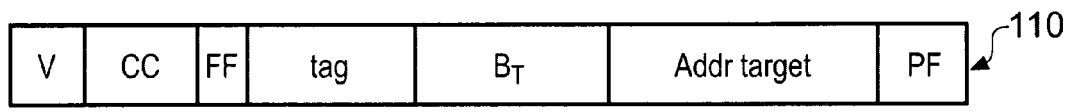

FIG. 5B shows a BTAC entry 110 corresponding to branch instruction 100. A BTAC entry comprises a valid bit V indicating whether the entry is valid or not, condition codes CC correspond to the condition code 100b of instruction 100 and a tag portion used to identify the entry and link it to the instruction from which it was formed. It also comprises a value Bt which indicates the type of branch the instruction relates to, it comprises an address target Addrtarget which gives the target address of the branch if it is taken and it comprises a prediction field PF. The prediction field PF predicts whether the branch is taken or not. It can be just one bit wide saying taken or not or it can be more than one bit wide giving some probability as to whether it is taken. There is also a further prediction field FF indicating whether a branch can be removed or not.

Figure 6:
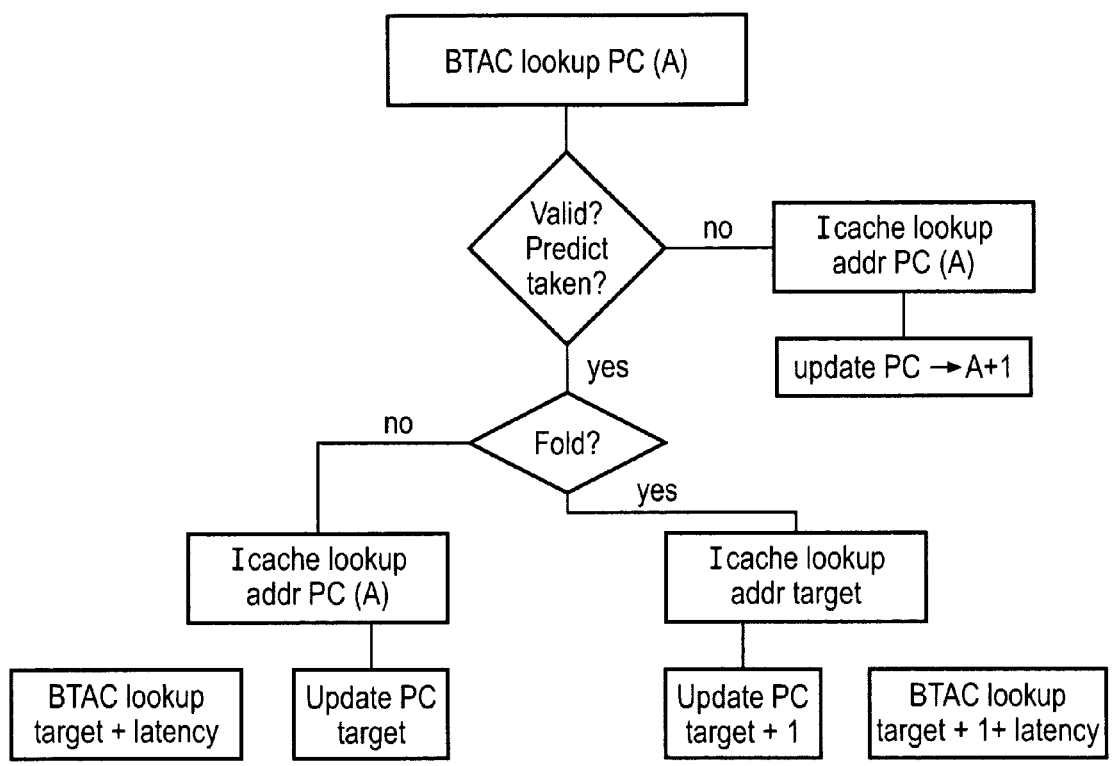
FIG. 6 shows a flow diagram of BTAC and Icache lookups according to an embodiment of the present invention.

FIG. 6 shows a flow diagram indicating steps taken by the prefetch unit in response to the program counter indicating instruction A which is a branch instruction. Initially, the BTAC is looked up and an entry corresponding to instruction A is retrieved. The prefetch unit then decides whether the entry is valid and predicted taken or not. If it is either not valid or predicted not taken then the I-cache is instructed to lookup the address relating to program counter A and the program counter is updated to A+1. If however the information from the BTAC indicates that the entry is valid and that it is predicted taken then it goes on to see whether or not the branch can be removed or folded. If it can be removed then the I-cache is instructed to lookup the target address taken from the BTAC entry and the PC is updated to target+1. At the same time the BTAC is instructed to lookup target+1+latency to see if there is any information corresponding to an address stored for this PC counter value. The latency of the system is the number of cycles required to perform a cache look up. In the embodiments illustrated in FIGS. 2 to 4 the latency was two cycles.

If it is determined that the branch can not be folded then the I-cache is instructed to lookup the address corresponding to a program counter corresponding to instruction A and the program counter is then updated to a target value from the information from the BTAC and the BTAC is instructed to look up a value corresponding to the target+the latency In the embodiment illustrated in FIG. 6 the instruction is only folded if the branch is predicted as being taken. However, in some alternative embodiments it could be that if the branch was valid but predicted not taken the branch could be folded too. This has the advantage of saving an instruction, however it has the disadvantage of the instructions becoming non-sequential. In the example given where A+1 is the branch instruction, if this is not taken but the instruction is folded the instructions sent to the processor become A, A+2, A+3 etc., rather than if no folding occurs A, A+1, A+2, A+3 etc. The non-sequential aspect can cause problems with some Icache optimisations, thus it depends on the implementation whether folding when branches are not taken occurs or not. It should also be noted that in many embodiments branches are taken more often than not so that it is not as big an issue as might be imagined.

The flow diagram of FIG. 6 shows what happens in the light of predictions made by the branch prediction logic. These need to be confirmed by the data processor to check that they are indeed correct, which is done some cycles later. Thus, the operation shown in FIG. 6 is performed each time the PFU pipe advances (i.e. an instruction is sent by the PFU to the core). In the embodiments shown condition codes from the original instruction are stored within the BTAC (see FIG. 5b) and these are used by the data processing apparatus to determine whether the branch should have been taken or not. This is done once the instruction is completed (i.e. the core knows for sure that the instruction is executed, and thus, it knows if the branch is taken or not). If the branch prediction was correct then no action is taken. However, if the branch prediction is resolved as false, the processor sends a flush operation to the PFU to instruct it to restart its prefetching to the alternate position. In this particular embodiment, the bus 90 of FIG. 2 which sends the instruction from the prefetch unit (PFU) to the processor core 50, also sends, in the case of a branch instruction, the location (i.e. the PC) of this alternative instruction that would be executed in the case that the branch went the other way to that predicted, i.e. in this case the location of instruction A+1 is sent along with instruction B. Thus, information relating to instruction A+1 is retrieved from the bus and instruction A+1 is sent to the decoder. At this point, the pipeline will generally be flushed and the process will start again from instruction A+1.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, comprising:
a processor for executing instructions;
a prefetch unit for prefetching instructions from a memory prior to sending those instructions to said processor for execution;
branch prediction logic; and
a branch target cache for storing predetermined information about branch operations executed by said processor, said predetermined information including, identification of an instruction specifying a branch operation, a target address for said branch operation and a prediction as to whether said branch operation is taken or not; wherein
said prefetch unit is configured prior to fetching an instruction from said memory, to access said branch target cache and to determine if there is predetermined information corresponding to said instruction stored within said branch target cache and if there is to retrieve said predetermined information;
said branch prediction logic is responsive to said retrieved predetermined information to predict whether said instruction specifies a branch operation that will be taken and will cause a change in instruction flow, and if so to indicate to said prefetch unit a target address within said memory from which a following instruction should be fetched; wherein
said access to said branch target cache is initiated at least one clock cycle before initiating fetching of said instruction from said memory.

2. A data processing apparatus according to claim 1, wherein said prefetch unit is configured to retrieve said predetermined information from said branch target cache within a predetermined number of cycles, said data processing apparatus being configured to initiate access to said branch target cache at least said predetermined number of cycles prior to fetching said instruction from said memory.

3. A data processing apparatus according to claim 2, wherein following a branch being taken said prefetch unit is configured to increment said target address by a value equal to said predetermined number of cycles and to access said branch target cache to determine if there is predetermined information corresponding to an instruction at said incremented target address stored within said branch target cache and if there is to retrieve said predetermined information.

4. A data processing apparatus according to claim 1, wherein said predetermined information further includes a branch removal prediction, said branch prediction logic being responsive to said accessed predetermined information predicting a branch operation that will be taken and predicting a branch instruction that can be removed, to indicate to said prefetch unit to fetch said following instruction from said target address and not to fetch said instruction.

5. A data processing apparatus according to claim 4, wherein said predetermined information includes further branch information, said predetermined information being sufficient to indicate to said data processing apparatus whether a branch is resolved as taken or not.

6. A data processing apparatus according to claim 5, wherein said further branch information comprises a condition code, said condition code indicating at least one condition, said at least one condition determining whether said branch should be taken or not.

7. A data processing apparatus according to claim 5, wherein following detection of a branch instruction by retrieving said corresponding predetermined information, said prefetch unit is configured to send a predicted following instruction in parallel with a non-predicted following instruction to said processor, said predicted following instruction being sent to said processor for execution.

8. A data processing apparatus according to claim 7, wherein following execution of said predicted following instruction said data processing apparatus is configured to determine whether said branch would be resolved as taken or not taken from said predetermined information corresponding to said instruction.

9. A data processing apparatus according to claim 8, wherein said data processing apparatus is responsive to said determination indicating that said branch prediction logic had falsely predicted said branch, to update said prediction within said predetermined information, to store said updated predetermined information within said branch target cache and to send said non-predicted following instruction to said processor-sere for execution.

10. A method of processing data comprising:
accessing a branch target cache within a data processing apparatus to determine if there is predetermined information corresponding to an instruction stored within said branch target cache and if there is retrieving said predetermined information;
in response to said retrieved predetermined information, predicting whether said instruction specifies a branch operation that will be taken and will cause a change in instruction flow, and if so indicating to a prefetch unit a target address within said memory from which a following instruction should be fetched;
prefetching instructions from a memory prior to sending those instructions to said processor for execution; wherein
said access to said branch target cache is initiated at least one clock cycle before initiating fetching of said instruction from said memory.

11. A data processing apparatus comprising:
a branch target cache for storing predetermined information about branch operations executed by said processor, said predetermined information including, identification of an instruction specifying a branch operation, a target address for said branch operation, a prediction as to whether said branch operation is taken or not and further branch information; wherein
said data processing apparatus is responsive to said predetermined information corresponding to said instruction stored in said branch target cache to resolve if said branch operation specified by said instruction is taken or not, said predetermined information further comprising a branch removal prediction indicative of whether said instruction specifying said branch operation can be removed or not.

12. A data processing apparatus according to claim 11, wherein said further branch information comprises a condition code, said condition code indicating at least one condition, said at least one condition determining whether said branch operation should be taken or not.

* * * * *